US008593733B2

(12) United States Patent
Kathman et al.

(10) Patent No.: US 8,593,733 B2
(45) Date of Patent: Nov. 26, 2013

(54) DIFFRACTIVE OPTICAL ELEMENTS AND APPLICATIONS THEREOF

(76) Inventors: Alan Kathman, Charlotte, NC (US); Robert Hutchins, Charlotte, NC (US)

( * ) Notice: Subject to any disclaimer, the term of this patent is extended or adjusted under 35 U.S.C. 154(b) by 233 days.

(21) Appl. No.: 13/154,034

(22) Filed: Jun. 6, 2011

(65) Prior Publication Data

US 2011/0299165 A1  Dec. 8, 2011

Related U.S. Application Data

(60) Provisional application No. 61/351,630, filed on Jun. 4, 2010.

(51) Int. Cl.
*G02B 5/18* (2006.01)
(52) U.S. Cl.
CPC ................................ *G02B 5/1866* (2013.01)
USPC .......................................................... 359/569
(58) Field of Classification Search
None
See application file for complete search history.

(56) References Cited

U.S. PATENT DOCUMENTS

| 7,180,672 B2* | 2/2007 | Olczak .......................... 359/621 |
| 2003/0002156 A1* | 1/2003 | Hobbs et al. .................. 359/573 |
| 2007/0183045 A1* | 8/2007 | Schilling et al. .............. 359/567 |
| 2010/0041239 A1* | 2/2010 | Flagello ....................... 438/758 |

* cited by examiner

*Primary Examiner* — Derek S Chapel
(74) *Attorney, Agent, or Firm* — Kilpatrick Townsend & Stockton LLP

(57) ABSTRACT

A fanout diffractive optical element having a discrete periodic surface relief structure having a 2-dimensional (x,y) shape is described. The surface relief structure can include a first lobe and a second lobe separated by a waist region having a width less than the first lobe and the second lobe. The 2-dimensional (x,y) shape of surface relief structure can have an inversion center and can lack symmetry about any plane that is normal to the surface relief structure. Also described are apparatuses having a fanout diffractive optical element and methods of producing a plurality of light diffracting orders using a fanout diffractive optical element.

34 Claims, 7 Drawing Sheets

DIFFRACTIVE OPTICAL ELEMENTS AND APPLICATIONS THEREOF

PRIORITY CLAIM

The present application claims priority under 35 USC 119 (e) from U.S. Provisional Patent Application Ser. No. 61/351,630, filed on Jun. 4, 2010, entitled "Diffractive Optical Elements and Applications Thereof," which is incorporated by reference in its entirety.

FIELD OF THE INVENTION

The present invention relates to diffractive optical elements and applications thereof.

BACKGROUND OF THE INVENTION

Diffractive optical elements are used to manipulate light in a variety of applications. Diffractive optical elements, for example, are commonly found in optical analytical instruments for separating polychromatic radiation into one or more monochromatic components. Diffractive optical elements are also used to provide desired diffraction orders of monochromatic radiation. Diffracting a beam of monochromatic radiation into a plurality of diffraction orders is advantageous in a number of applications including optical computing and data transmission systems as well as parallel processing systems.

SUMMARY

Described herein are various embodiments of a fanout diffractive optical element. In some embodiments, a fanout diffractive optical element comprises a discrete periodic surface relief structure having a 2-dimensional (x,y) shape. The surface relief structure includes a first lobe and a second lobe separated by a waist region where the waist region has a width less than the first lobe and the second lobe. The 2-dimensional (x,y) shape of the surface relief structure has an inversion center and lacks symmetry about any plane that is normal to the surface relief structure.

In some embodiments, the surface relief structure can be substantially symmetrical about a $C_2$ rotational axis.

In some embodiments, the surface relief structure comprises a single plateau profile having a base area and a top area, where the ratio of the top area to the base area is at least about 0.80. In other embodiments, the ratio of the top area to the base area is at least about 0.95.

In some embodiments, the ratio of the width of the waist region of the surface relief structure to a length of the surface relief structure is less than about 0.7. In other embodiments, the ratio of the width of the waist region of the surface relief structure to the length of the surface relief structure is less than about 0.6.

In some embodiments, the surface relief structure can have a height of at least about 0.5 μm. In other embodiments, the surface relief structure can have a height of at least about 0.9 μm.

In some embodiments, the fanout diffractive optical element comprises a plurality of discrete periodic surface relief structures. In some embodiments, a first surface relief structure is spatially separated from a second relief structure by at least about 0.25 μm. In some embodiments, the surface relief structure is periodic in two directions. In some such embodiments, the periodicity of the surface relief structure is different in orthogonal directions. In some embodiments, the fanout diffractive optical element is a 3×3 fanout diffractive optical element.

In some embodiments, the surface relief structure comprises borosilicate glass or fused silica.

In some embodiments, the diffractive optical element can have a diffraction efficiency of at least about 70%.

Also described herein are apparatuses comprising a fanout diffractive optical element. In some embodiments, an apparatus comprises a light source and a fanout diffractive optical element. The fanout diffractive optical element comprises a discrete periodic surface relief structure having a 2-dimensional (x,y) shape. The surface relief structure includes a first lobe and a second lobe separated by a waist region where the waist region has a width less than the first lobe and the second lobe. The 2-dimensional (x,y) shape of the surface relief structure has an inversion center and lacks symmetry about any plane that is normal to the surface relief structure.

In some embodiments, the surface relief structure of the apparatus comprises a single plateau profile having a base area and a top area, where the ratio of the top area to the base area is at least about 0.80.

In some embodiments, light from the light source can be substantially monochromatic. In some embodiments, light from the light source can have a wavelength ranging from about 600 nm to about 900 nm. The light can be a laser in some embodiments.

Some embodiments of the apparatuses described herein can include at least one refractive optical element positioned between the light source and the fanout diffractive optical element. In some embodiments, the at least one refractive optical element can be a collimating lens. In some embodiments, the apparatuses described herein can include at least one spacer between the at least one refractive optical element and the fanout diffractive optical element. In yet other embodiments, the apparatuses described herein can include at least one diffractive optical element positioned between the light source and the fanout diffractive optical element. The at least one diffractive optical element can be a collimating diffractive optical element in some embodiments. The at least one diffractive optical element can be coupled to the fanout diffractive optical element.

Also described herein are methods of producing a plurality of light diffraction orders. In some embodiments, a method can include providing a light source; providing a fanout diffractive optical element comprising a periodic surface relief structure; passing at least a portion of light from the light source through the fanout diffractive optical element; and splitting the light received from the light source into the plurality of diffraction orders. The surface relief structure has a 2-dimensional (x,y) shape. The surface relief structure includes a first lobe and a second lobe separated by a waist region where the waist region has a width less than the first lobe and the second lobe. The 2-dimensional (x,y) shape of the surface relief structure has an inversion center and lacks symmetry about any plane that is normal to the surface relief structure.

In some embodiments, the plurality of diffraction orders can have substantially the same power. In some embodiments, the plurality of diffraction orders are in an array. In some such embodiments, the array is a two-dimensional array.

In some embodiments, the method further includes collimating light from the light source prior to passing the light through the fanout diffractive optical element. In some embodiments, collimating light comprises passing the light through at least one refractive optical element. In some embodiments, collimating light comprises passing the light through at least one diffractive optical element.

These illustrative aspects and embodiments are mentioned not to limit or define the invention, but to provide examples to aid understanding of the inventive concepts disclosed in this application. Other aspects, advantages, and features of the present invention will become apparent after review of the entire application.

DETAILED DESCRIPTION

Figure 1:
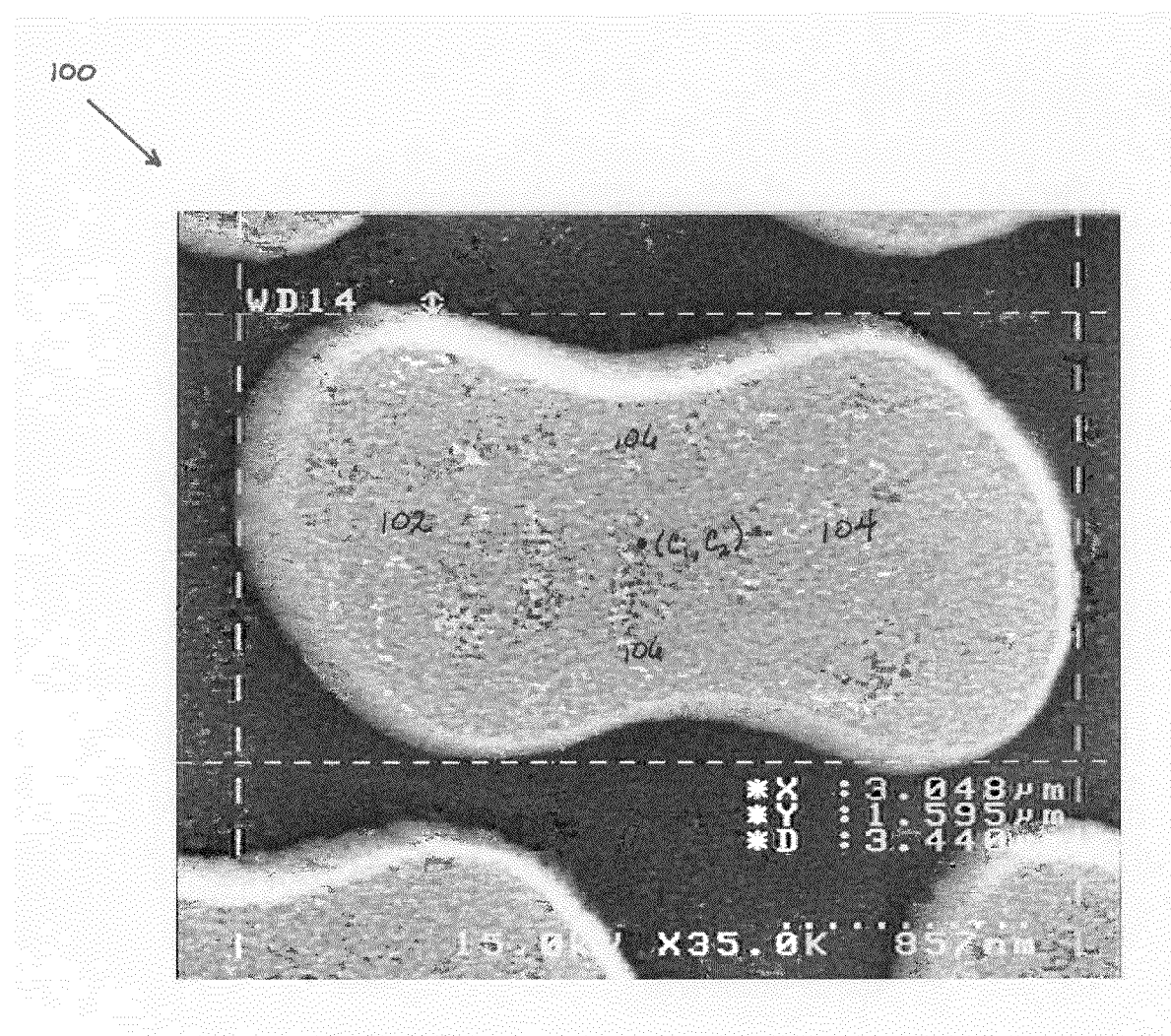
FIG. 1 illustrates a scanning electron micrograph (SEM) image of a discrete periodic surface relief structure of a fanout diffractive optical element according to one embodiment of the present invention.

The present invention can be understood more readily by reference to the following detailed description, examples and drawings and their previous and following descriptions. Elements, apparatus and methods of the present invention, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

In one aspect, the present invention provides a fanout diffractive optical element comprising a discrete periodic surface relief structure having a 2-dimensional (x,y) shape. The surface relief structure includes a first lobe and a second lobe separated by a waist region where the waist region has a width less than the first lobe and the second lobe. The 2-dimensional (x,y) shape of the surface relief structure has an inversion center and lacks symmetry about any plane that is normal to the surface relief structure. An inversion center ($C_i$), as used herein, refers to a symmetry operation wherein the 2-dimensional shape (x,y) of the discrete periodic surface relief structure can be brought into an equivalent configuration or substantially equivalent configuration by changing the coordinates (x,y) of each point of the 2-dimensional shape into (−x,−y), where the origin of coordinates lies at a point within the 2-dimensional shape, the origin of coordinates being the inversion center.

A periodic surface relief structure of a fanout diffractive optical element described herein, in some embodiments, has a single plateau profile. The plateau of the surface relief structure has a top area and a base area. In some embodiments, a ratio of the top area of the plateau to the base area of the plateau is at least 0.8. In some embodiments, the fanout diffractive optical element is a M×M fanout diffractive optical element.

I. Fanout Diffractive Optical Elements

In some embodiments, the present invention provides fanout diffractive optical elements. In some embodiments, a fanout diffractive optical element comprises a discrete periodic surface relief structure having a 2-dimensional shape (x,y) comprising a first lobe and a second lobe separated by a waist region, the waist region having a width less than the first lobe and the second lobe.

In some embodiments, the 2-dimensional shape (x,y) of the periodic surface relief structure lacks symmetry about any plane normal to the surface relief structure. In some embodiments, for example, the 2-dimensional shape (x,y) of the surface relief structure does not have a vertical plane of symmetry.

In some embodiments, the 2-dimensional shape (x,y) of the surface relief structure is symmetrical or substantially symmetrical about an inversion center ($C_i$). Moreover, in some embodiments, the 2-dimensional shape (x,y) of the surface relief structure is symmetrical or substantially symmetrical about a $C_2$ rotational axis. A $C_2$ rotational axis, as used herein, refers to a symmetry operation wherein the 2-dimensional shape (x,y) of the surface relief structure is rotated 180° in the (x,y) plane.

FIG. 1, is a SEM image of a discrete periodic surface relief structure according to one embodiment of the present invention. As illustrated in FIG. 1, the 2-dimensional shape (x,y) of the surface relief structure (100) comprises a first lobe (102) and a second lobe (104). The first lobe (102) and the second lobe (104) are separated by a waist region (106), the waist region (106) having a width less than the first lobe (102) and the second lobe (104).

In the embodiment of FIG. 1, the 2-dimensional shape (x,y) of the surface relief structure is symmetrical or substantially symmetrical about an inversion center $C_i$. Moreover, in the embodiment of FIG. 1, the 2-dimensional shape (x,y) of the surface relief structure is symmetrical or substantially symmetrical about a $C_2$ rotational axis.

In some embodiments, the first lobe and the second lobe of the 2-dimensional shape (x,y) of the surface relief structure have the same or substantially the same widths. In some embodiments, the first lobe and the second lobe of the 2-dimensional shape (x,y) of the surface relief structure have the same or substantially the same areas. In some embodiments, the ratio of the area of the first lobe to the area of the second lobe of the 2-dimensional shape (x,y) of the surface relief structure ranges from about 0.7 to about 1.3. The ratio of the area of the first lobe to the area of the second lobe of the 2-dimensional shape (x,y) of the surface relief structure, in some embodiments, ranges from about 0.8 to about 1.2. In some embodiments, the ratio of the area of the first lobe to the area of the second lobe of the 2-dimensional shape (x,y) of the surface relief structure ranges from about 0.9 to about 1.1.

Moreover, in some embodiments, a ratio of the width of the waist region to the width of the first lobe or the width of the second lobe is at least about 0.6. In some embodiments, the ratio of the width of the waist region to the width of the fist lobe or the width of the second lobe is at least about 0.7 or at least about 0.8. In some embodiments, the ratio of the width of the waist to the width of the first lobe or the width of the second lobe ranges from about 0.7 to about 0.95.

Additionally, in some embodiments, a ratio of the width of the waist region to the length of the 2-dimensional (x,y) shape of the surface relief structure is less than about 0.8. In some embodiments, the ratio of the width of the waist region to the length of the 2-dimensional (x,y) shape of the surface relief structure is less than about 0.7 or less than about 0.6.

The periodic surface relief structure described herein, in some embodiments, has a single plateau profile. The single plateau of the surface relief structure has a top area and a base area. In some embodiments, the ratio of the top area to the base area of the plateau is at least about 0.7. In some embodiments, the ratio of the top area to the base area of the plateau is at least about 0.8. In some embodiments, the ratio of the top area to the base area of the plateau is at least about 0.9 or at least about 0.95. In some embodiments, the ratio of the top area to the base area of the plateau ranges from about 0.7 to 1.

In some embodiments, the single plateau of the surface relief structure has a height of at least about 0.5 μm. The single plateau, in some embodiments, has a height of at least about 0.9 μm.

In being discrete, a first surface relief structure of a fanout diffractive optical element described herein is spatially separated from a second surface relief structure of the fanout diffractive optical element. In some embodiments, each surface relief structure of a fanout diffractive optical element described herein is spatially separated from every other surface relief structure of the fanout diffractive optical element. In some embodiments, a first surface relief structure is spatially separated from a second surface relief structure by at least about 0.25 μm.

Moreover, in some embodiments, a surface relief structure described herein is periodic in a first direction and periodic in a second direction. In some embodiments, the first direction is normal to the second direction. Additionally, in some embodiments, the periodicity of a surface relief structure described herein in a first direction is different than the periodicity of the surface relief structure in a second direction. In some embodiments, the periodicity of the surface relief structure is the same in the first direction and the second direction. In some embodiments, the period of the surface relief structure is less than 10 times the wavelength of operation and any direction. In some embodiments, the period of the surface relief structure is less than 6 times the wavelength of operation in any direction.

Figure 2:
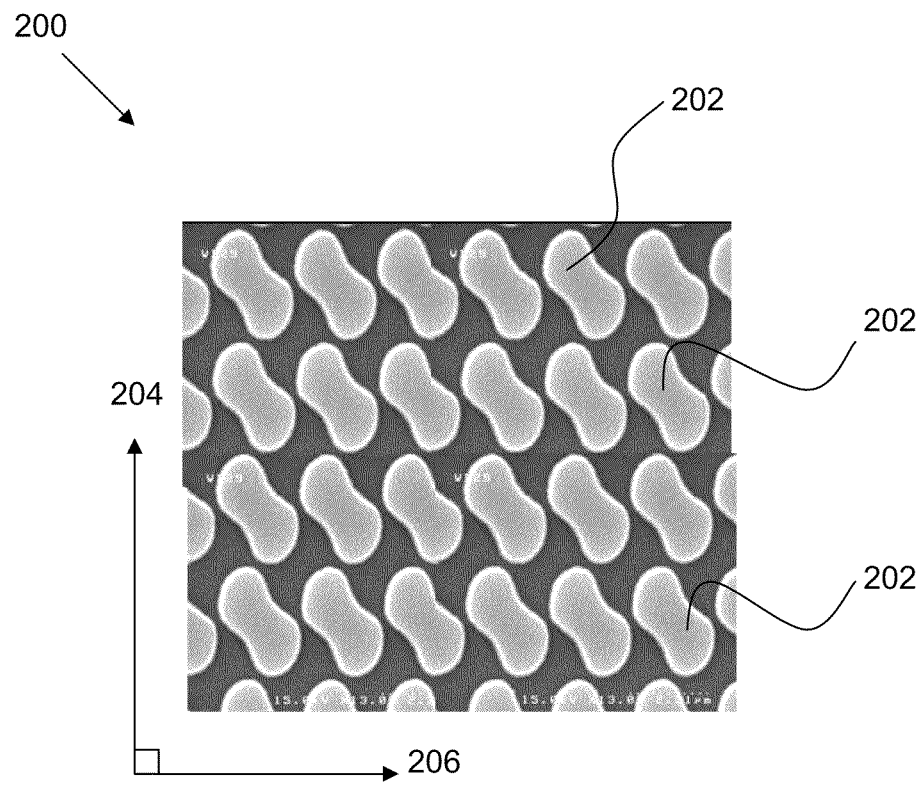
FIG. 2 illustrates a top plan view of a fanout diffractive optical element according to one embodiment of the present invention.

FIG. 2 illustrates a top plan view of a fanout diffractive optical element according to one embodiment of the present invention. As illustrated in FIG. 2, a surface relief structure (202) described herein having a 2-dimensional shape (x,y) comprising a first lobe and a second lobe separated by a waist region having a width less than the first lobe and the second lobe is periodic in a first direction (204) and a second direction (206) of the fanout diffractive optical element (200). The first direction (204) is normal to the second direction (206). Additionally, the surface relief structures (202) of the fanout diffractive optical element (200) are spatially separated.

A fanout diffractive optical element comprising a periodic surface relief structure described herein, in some embodiments, is a M×M fanout diffractive optical element. In some embodiments, a fanout diffractive optical element described herein is a 3×3 fanout diffractive optical element. Additionally, in some embodiments, a fanout diffractive optical element comprising a periodic surface relief structure is a N×M fanout diffractive optical element.

In some embodiments, a fanout diffractive optical element comprising a periodic surface relief structure described herein has a diffraction efficiency of at least about 60%. In some embodiments, a fanout diffractive optical element comprising a periodic surface relief structure described herein has a diffraction efficiency of at least about 70%. In some embodiments, a fanout diffractive optical element comprising a periodic surface relief structure described herein has a diffraction efficiency up to about 80%. In some embodiments, a fanout diffractive optical element comprising a periodic surface relief structure described herein has a diffraction efficiency up to about 90%. A fanout diffractive optical element comprising a periodic surface relief structure described herein, in some embodiments, has a diffraction efficiency ranging from about 50% to about 90%.

A fanout diffractive optical element described herein can comprise any material not inconsistent with the objectives of the present invention. In some embodiments, a fanout diffractive optical element described herein comprises a glass including a silica glass such as quartz, fused quartz or fused silica. In some embodiments, a fanout diffractive optical element comprises borosilicate glass. A fanout diffractive optical element, in some embodiments, comprises one or more polymeric materials not inconsistent with the objectives of the present invention. Moreover, in some embodiments, a fanout diffractive optical element described herein does not comprise a polymeric or organic material.

A fanout diffractive optical element comprising a periodic surface relief structure described herein, in some embodiments, can be produced according to reactive ion etching (RIE) techniques. In some embodiments, a substrate is patterned with a resist comprising a plurality of 2-dimensional shapes (x,y) corresponding to the 2-dimensional shape (x,y) of a periodic surface relief structure described herein. The substrate patterned with the resist is subsequently subjected to reactive ion etching processes to produce surface relief structures on the substrate having the desired etch depth and 2-dimensional shape (x,y). The resist is removed to produce a fanout diffractive optical element described herein.

II. Apparatus Comprising Diffractive Optical Element

In another aspect, the present invention provides an apparatus comprising a light source and a fanout diffractive optical element positioned to receive light from the light source, the fanout diffractive optical element comprising a discrete periodic surface relief structure having a 2-dimensional (x,y) shape comprising a first lobe and a second lobe separated by a waist region, the waist region having a width less than the first lobe and the second lobe. In some embodiments, the fanout diffractive optical element of an apparatus comprises any of the same described in Section I hereinabove.

In some embodiments, the light source of an apparatus provides monochromatic or substantially monochromatic electromagnetic radiation. The light source, in some embodiments, provides electromagnetic radiation having a wavelength ranging from about 600 nm to about 900 nm.

In some embodiments, the monochromatic radiation is polarized. A light source, in some embodiments, is a laser.

An apparatus comprising a light source and a fanout diffractive optical element, in some embodiments, further comprises at least one optical element positioned between the light source and the fanout diffractive optical element. The at least one optical element, in some embodiments, comprises a refractive optical element. In some embodiments, the at least one optical element comprises a diffractive optical element. The at least one optical element, in some embodiments, is a collimating refractive optical element or a collimating diffractive optical element.

In some embodiments, a plurality of optical elements are positioned between the light source and the fanout diffractive optical element. The plurality of optical elements, in some embodiments, comprise refractive optical elements, diffractive optical elements or combinations thereof.

In some embodiments, a refractive or diffractive optical element positioned between the light source and the fanout diffractive optical element is spaced apart from the fanout diffractive optical element. In some embodiments, one or more spacers are used to space a refractive or diffractive optical element from the fanout diffractive optical element. Additionally, in some embodiments, one or more spacers are used to space a refractive or diffractive optical element from the light source of the apparatus. The height of one or more spacers can be set to any value to achieve the desired optical performance or output from the refractive optical element or diffractive optical element.

In some embodiments, a refractive or diffractive optical element positioned between the light source and the fanout diffractive optical element is coupled to the fanout diffractive optical element. In some embodiments, for example, a refractive or diffractive optical element is coupled to a surface of the fanout diffractive optical element in facing opposition to the surface relief structures of the fanout diffractive optical element. In some embodiments, a refractive or diffractive optical element is deposited directly onto or etched into a surface of the fanout diffractive optical element in facing opposition to the surface relief structures. In some embodiments, a refractive or diffractive optical element is coupled to a surface of the fanout diffractive optical element in facing opposition to the surface relief structures by an adhesive, other chemical agent or by mechanical means.

Figure 3:
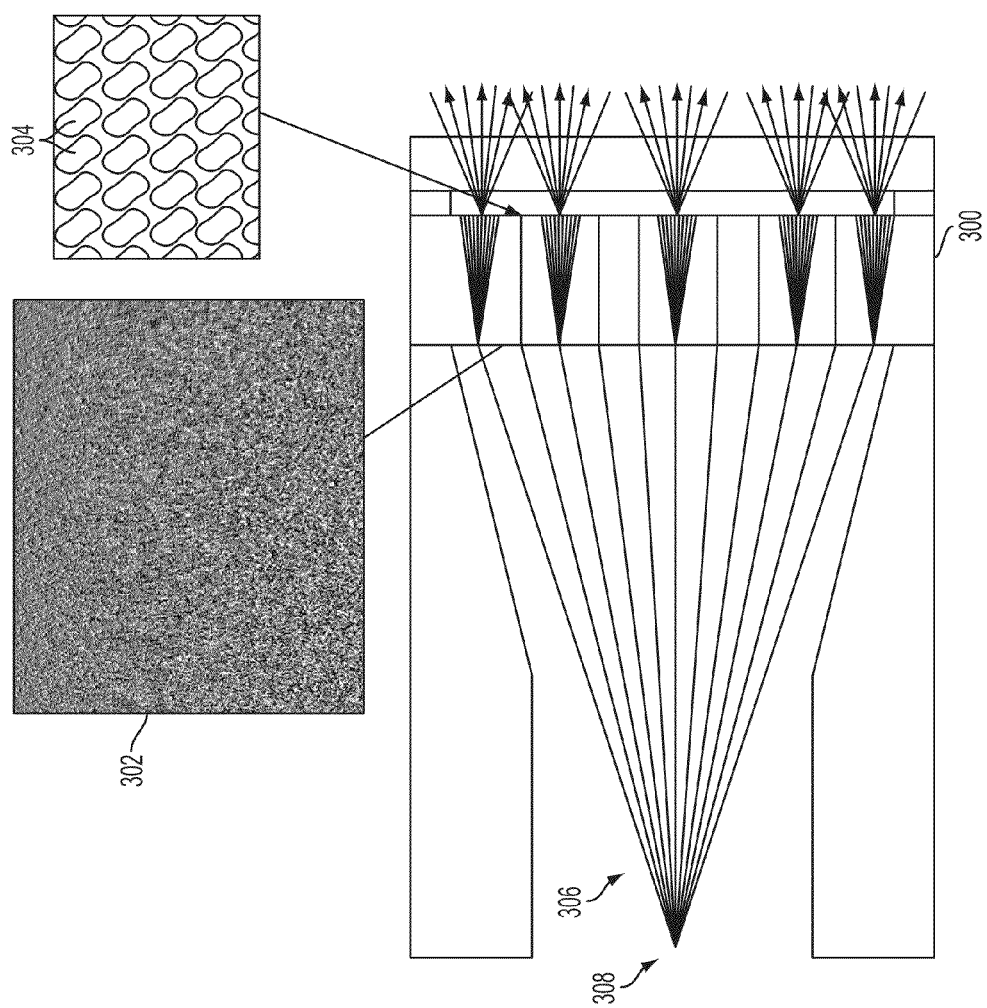
FIG. 3 illustrates a collimating diffractive optical element in conjunction with a fanout diffractive optical element according to one embodiment of the present invention.

FIG. 3 illustrates a collimating diffractive optical element in conjunction with a fanout diffractive optical element according to one embodiment of the present invention. In the embodiment of FIG. 3, the collimating diffractive optical element (302) is coupled to a surface of the fanout diffractive optical element (300) in facing opposition to the surface relief structures (304) of the fanout diffractive optical element (300). The surface structure of the collimating diffractive optical element (302) provided in FIG. 3 is one quadrant of the collimating diffractive optical element (302). Grating type structures are evident in the center of the quadrant while lensing functions become more prominent at the edge of the quadrant of the collimating diffractive optical element (302). As shown in FIG. 3, the diffractive optical element (302) collimates or substantially collimates light (306) received from the light source (308) prior to the light (306) interacting with surface relief structures (304) of the fanout diffractive optical element (302).

Figure 4:
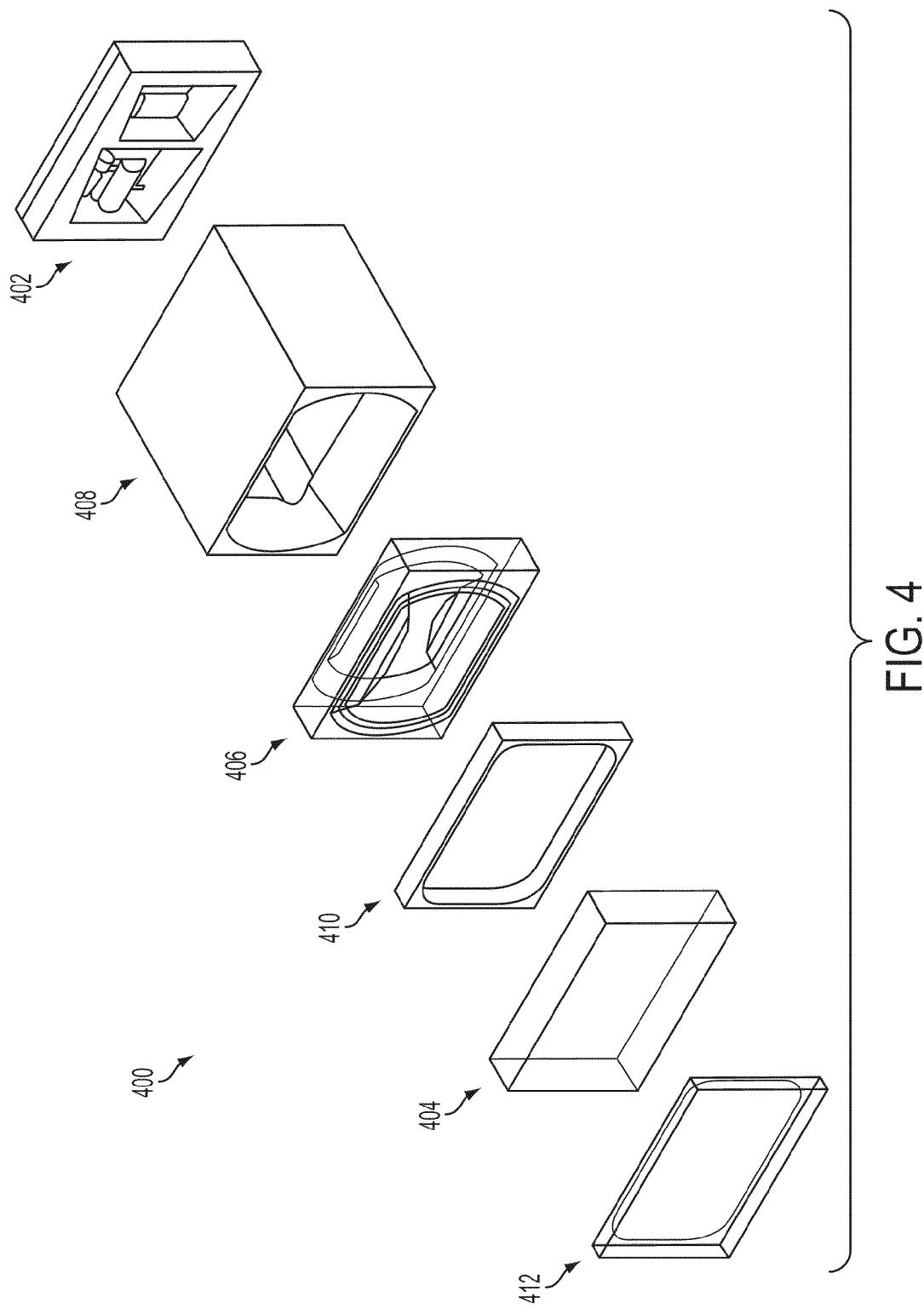
FIG. 4 illustrates an exploded perspective view of an apparatus according to one embodiment of the present invention.
Figure 5:
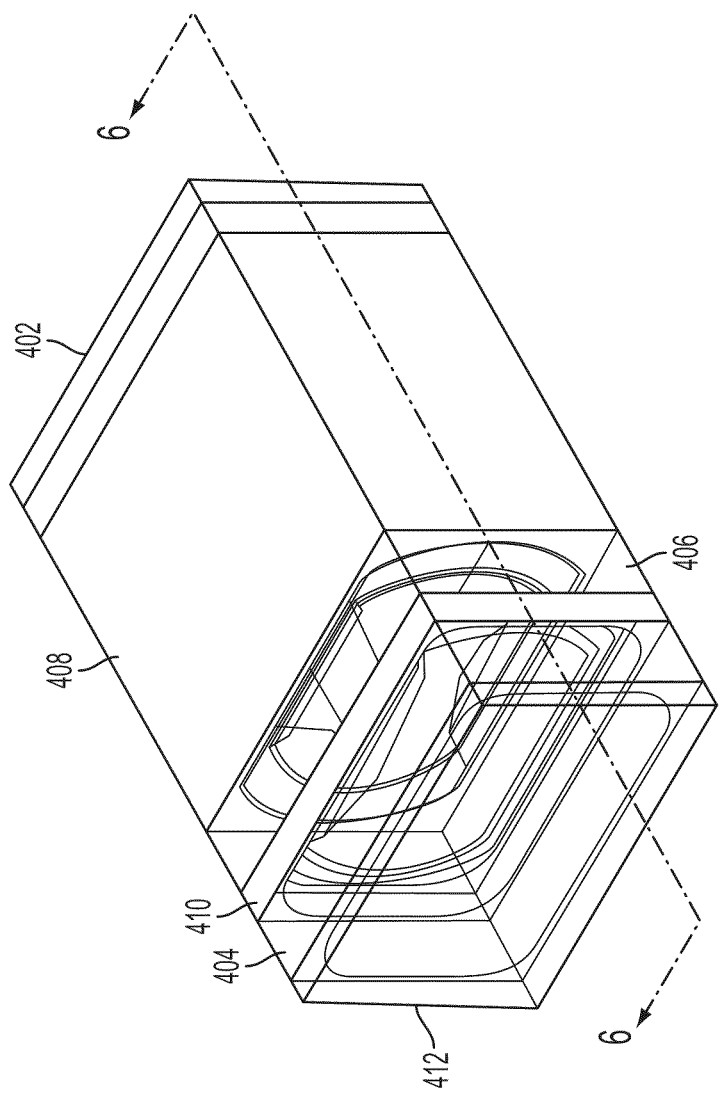
FIG. 5 illustrates a perspective view of an apparatus according to one embodiment of the present invention.

FIG. 4 illustrates an exploded perspective view of an apparatus according to one embodiment of the present invention. The apparatus (400) of FIG. 4 comprises a laser light source (402) and a fanout diffractive optical element (404) having a periodic surface relief structure described herein positioned to receive light from the laser light source (402). A refractive optical element (406) is positioned between the laser light source (402) and the fanout diffractive optical element (404). As described herein, in some embodiments, the refractive optical element (406) is a collimating refractive optical element. Spacers (408, 410) separate the refractive optical element from the laser light source (402) and the fanout diffractive optical element (404). A cover glass (412) is positioned over the fanout diffractive optical element (404). FIG. 5 illustrates the apparatus (400) of FIG. 4 in an assembled state.

Figure 6:
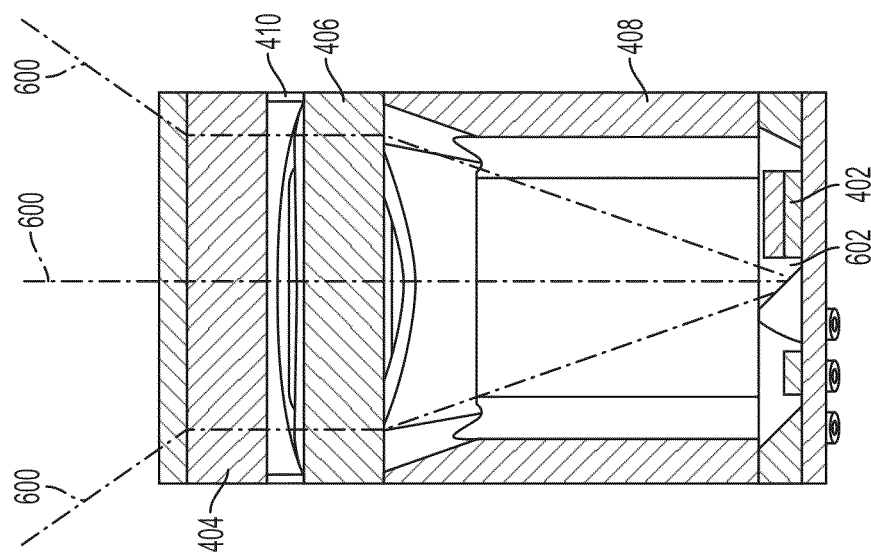
FIG. 6 illustrates a cross-sectional view of an apparatus of FIG. 5 along the 6-6 plane according to one embodiment of the present invention.

FIG. 6 illustrates a cross-sectional view of the apparatus (400) of FIG. 5 along the 6-6 plane. As illustrated in FIG. 6, light (600) provided by the light source (402) is reflected from a mirrored cavity (602) in which the light source is positioned to the refractive optical element (406) where the light (600) is collimated or substantially collimated. The light (600) proceeds to the fanout diffractive optical element (404) having a periodic surface relief structure described herein for diffraction into an array of orders.

In some embodiments, an apparatus comprising a light source and a fanout diffractive optical element further comprises at least one sensing element. A sensing element of an apparatus described herein is operable to detect electromagnetic radiation. In some embodiments, electromagnetic radiation comprises ultraviolet radiation, visible radiation, infrared radiation or mixtures thereof. In some embodiments, infrared radiation comprises near infrared radiation (NIR) or short wavelength infrared radiation (SWIR), mid-wavelength infrared radiation (MWIR) or mixtures thereof.

In some embodiments, a sensing element comprises one or more semiconductor materials. Any suitable semiconductor not inconsistent with the objectives of the present invention can be used for the sensing element. In some embodiments, a semiconductor comprises a Group IV semiconductor, including silicon or any combination of Group IV elements. In another embodiment, a semiconductor comprises a Group II/VV semiconductor or a Group II/VI semiconductor.

In some embodiments, a sensing element comprises a focal plane array. A focal plane array, in some embodiments, is a VGA sensor, comprising 640×480 pixels. In some embodiments, the sensor element includes fewer pixels (e.g., CIF, QCIF), or more pixels (1 or more megapixel).

In one embodiment, a sensing element comprises a charge coupled device (CCD). In another embodiment, a sensing element comprises a complimentary metal oxide semiconductor (CMOS) architecture.

In some embodiments, a sensing element detects electromagnetic radiation from a scene at least partially illuminated with light provided by the light source and diffracted by the fanout diffractive optical element. In some embodiments, an apparatus described herein further comprises one or more processors operable to receive electrical information from the sensing element and recreate the scene in an electronic format. In some embodiments, the processor recreates the scene in an electronic format suitable for viewing by one or more individuals. Moreover, an apparatus described herein comprising a sensing element and a processor is operable to detect motion in a scene at least partially illuminated with light provided by the light source and diffracted by the fanout diffractive optical element.

Figure 7:
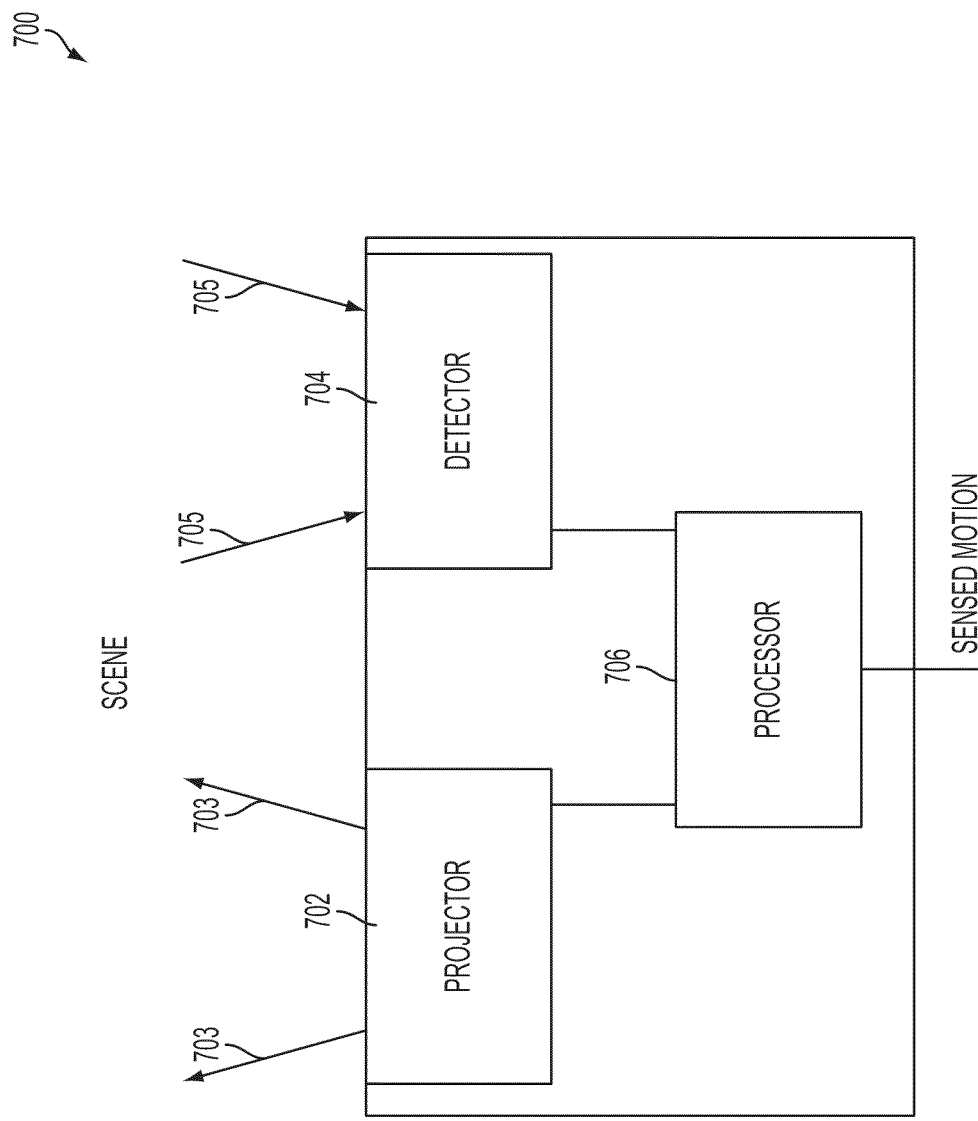
FIG. 7 illustrates a block diagram of an apparatus according to one embodiment of the present invention.

FIG. 7 illustrates a block diagram of an apparatus comprising a sensing element and a processor in conjunction with a projector according to one embodiment of the present invention. The projector (702) of the apparatus (700) illustrated in FIG. 7 comprises a light source (not shown) and fanout diffractive optical element (not shown) as described herein. In some embodiments, the projector (702) can have a construction consistent with the apparatus (400) illustrated in FIG. 4 described hereinabove. Moreover, the detector (704) can have any desired construction not inconsistent with the objectives of the present invention. In some embodiments, the detector (704) has a construction consistent with any construction described herein for a sensing element. The projector (702) and the detector (704) are in electrical communication with the processor (706), thereby allowing the processor to provide and receive data from the projector (702) and the detector (704).

As described further herein, the projector (702) provides a scene with light (703) from the light source diffracted by the fanout diffractive optical element, and the detector (704) senses at least a portion of the diffracted light (705) returned from the scene. The detector (704) converts the portion of light (705) returned from the scene into electrical signals, and the processor (706) processes the signals into an electronic image of the scene. In some embodiments, the apparatus (700) is operable to detect or sense motion in the scene.

III. Methods of Diffracting Light

In another aspect, the present invention comprises methods of diffracting light. In some embodiments, for example, the present invention provides methods of producing a plurality of light diffraction orders. A method of producing a plurality of light diffraction orders, in some embodiments, comprises providing a light source, providing a fanout diffractive optical element, passing at least a portion of light from the light source through the fanout diffractive optical element and splitting the light into the plurality of diffraction orders, wherein the fanout diffractive optical element comprises a discrete periodic surface relief structure having a 2-dimensional (x,y) shape comprising a first lobe and a second lobe separated by a waist region, the waist region having a width less than the first lobe and the second lobe. A fanout diffractive optical element, in some embodiments of diffracting light, can have any properties and/or constructions described in Section I hereinabove for a fanout diffractive optical element.

In some embodiments, light from the light source is monochromatic or substantially monochromatic. Light from the light source, in some embodiments, is polarized. In some embodiments, light diffracted into a plurality of diffraction orders is laser light.

The plurality of diffraction orders, in some embodiments, are in an array. In some embodiments, the plurality of diffraction orders are in a two-dimensional array. In some embodiments, the plurality of diffraction orders are in a one-dimensional array.

A method of producing a plurality of light diffraction orders, in some embodiments, further comprises collimating or substantially collimating the light from the light source prior to passing the light through the fanout diffractive optical element comprising a periodic surface relief structure described herein. In some embodiments, collimating or substantially collimating the light comprises passing the light through at least one refractive optical element. Collimating or substantially collimating the light, in some embodiments, comprises passing the light through at least one diffractive optical element.

IV. Methods of Imaging a Scene

In a further aspect, the present invention provides methods of imaging a scene. In some embodiments, a method of imaging a scene comprises providing an apparatus comprising a light source, a fanout diffractive optical element and a sensing element, illuminating the scene with light from light source diffracted by the fanout diffractive optical element and sensing at least a portion of the diffracted light returned from the scene with the sensing element, wherein the fanout diffractive optical element comprises a discrete periodic surface relief structure having a 2-dimensional (x,y) shape comprising a first lobe and a second lobe separated by a waist region, the waist region having a width less than the first lobe and the second lobe. A fanout diffractive optical element, in some embodiments of imaging a scene, can have any properties and/or constructions described in Section I hereinabove for a fanout diffractive optical element. Moreover, in some embodiments, an apparatus comprising a light source, a fanout diffractive optical element and a sensing element can have any properties and/or constructions of an apparatus discussed in Section II hereinabove.

A method of imaging a scene, in some embodiments, further comprises converting the portion of light sensed by the sensing element into electrical signals and processing the electrical signals into an electronic image of the scene or to detect motion in the scene.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

What is claimed is:

1. A fanout diffractive optical element comprising:
a discrete periodic surface relief structure having a 2-dimensional (x,y) shape comprising a first lobe and a second lobe separated by a waist region, the waist region having a width less than the first lobe and the second lobe, the 2-dimensional (x,y) shape having an inversion center and lacking symmetry about any plane that is normal to the surface relief structure.

2. The fanout diffractive optical element of claim 1, wherein the surface relief structure has a single plateau profile having a base area and a top area, wherein a ratio of the top area to the base area is at least about 0.80.

3. The fanout diffractive optical element of claim 2, wherein the ratio of the top area to the base area is at least about 0.90.

4. The fanout diffractive optical element of claim 2, wherein the ratio of the top area to the base area is at least about 0.95.

5. The fanout diffractive optical element of claim 1, wherein a ratio of the width of the waist region to a length of the surface relief structure is less than about 0.7.

6. The fanout diffractive optical element of claim 5, wherein the ratio of the width of the waist region to the length of the surface relief structure is less than about 0.6.

7. The fanout diffractive optical element of claim 1, wherein the surface relief structure has a height of at least about 0.5 µm.

8. The fanout diffractive optical element of claim 1, wherein the surface relief structure has a height of at least about 0.9 µm.

9. The fanout diffractive optical element of claim 1 comprising a plurality of discrete periodic surface relief structures.

10. The fanout diffractive optical element of claim 1, wherein a first surface relief structure is spatially separated from a second surface relief structure by at least about 0.25 µm.

11. The fanout diffractive optical element of claim 1, wherein the surface relief structure is periodic in two directions.

12. The fanout diffractive optical element of claim 11, wherein the periodicity of the surface relief structure is different in orthogonal directions.

13. The fanout diffractive optical element of claim 1, wherein the fanout diffractive optical element is a 3×3 fanout diffractive optical element.

14. The fanout diffractive optical element of claim 1, wherein the surface relief structure comprises borosilicate glass or fused silica.

15. The fanout diffractive optical element of claim 1 having a diffraction efficiency of at least about 70%.

16. The fanout diffractive optical element of claim 1, wherein the surface relief structure is substantially symmetrical about a $C_2$ rotational axis.

17. An apparatus comprising:
a light source; and
a fanout diffractive optical element positioned to receive light from the light source, the fanout diffractive optical element comprising a periodic surface relief structure, the surface relief structure having a 2-dimensional (x,y) shape comprising a first lobe and a second lobe separated by a waist region, the waist region having a width less than the first lobe and the second lobe, the 2-dimensional (x,y) shape having an inversion center and lacking symmetry about any plane that is normal to the surface relief structure.

18. The apparatus of claim 17, wherein the surface relief structure comprises a single plateau profile having a base area and a top area, wherein a ratio of the top area to the base area is at least about 0.80.

19. The apparatus of claim 17, wherein light from the light source is substantially monochromatic.

20. The apparatus of claim 17, wherein light from the light source has a wavelength ranging from about 600 nm to about 900 nm.

21. The apparatus of claim 17, wherein the light source is a laser.

22. The apparatus of claim 17 further comprising at least one refractive optical element positioned between the light source and the fanout diffractive optical element.

23. The apparatus of claim 22, wherein the at least one refractive optical element is a collimating lens.

24. The apparatus of claim 22 further comprising at least one spacer between the at least one refractive optical element and the fanout diffractive optical element.

25. The apparatus of claim 17 further comprising at least one diffractive optical element positioned between the light source and the fanout diffractive optical element.

26. The apparatus of claim 25, wherein the at least one diffractive optical element is a collimating diffractive optical element.

27. The apparatus of claim 25, wherein the at least one diffractive optical element is coupled to the fanout diffractive optical element.

28. A method of producing a plurality of light diffraction orders comprising:
   providing a light source;
   providing a fanout diffractive optical element comprising a periodic surface relief structure, the surface relief structure having a 2-dimensional (x,y) shape comprising a first lobe and a second lobe separated by a waist region, the waist region having a width less than the first lobe and the second lobe, the 2-dimensional (x,y) shape having an inversion center and lacking symmetry about any plane that is normal to the surface relief structure;
   passing at least a portion of light from the light source through the fanout diffractive optical element; and
   splitting the light received from the light source into the plurality of diffraction orders.

29. The method of claim 28, wherein the plurality of diffraction orders have substantially the same power.

30. The method of claim 28, wherein the plurality of diffraction orders are in an array.

31. The method of claim 30, wherein the array is a two-dimensional array.

32. The method of claim 28 further comprising collimating light from the light source prior to passing the light through the fanout diffractive optical element.

33. The method of claim 28, wherein collimating light comprises passing the light through at least one refractive optical element.

34. The method of claim 28, wherein collimating light comprises passing the light through at least one diffractive optical element.

* * * * *